United States Patent [19]

Terry et al.

[11] Patent Number: 5,096,689

[45] Date of Patent: Mar. 17, 1992

[54] PROCESS FOR PRODUCING TUNGSTEN MONOCARBIDE

[75] Inventors: Charles J. Terry; Harold C. Newman, both of Fallon, Nev.

[73] Assignee: Kennametal Inc., Latrobe, Pa.

[21] Appl. No.: 657,278

[22] Filed: Feb. 19, 1991

Related U.S. Application Data

[63] Continuation of Ser. No. 299,298, Jan. 23, 1989, abandoned.

[51] Int. Cl.$^5$ ............... C01B 31/34; C01G 41/00; C04B 35/36
[52] U.S. Cl. ............................ 423/440; 423/53; 423/DIG. 12
[58] Field of Search ................. 423/53, 440, DIG. 12

[56] References Cited

U.S. PATENT DOCUMENTS

| | | | |
|---|---|---|---|
| Re. 32,612 | 2/1988 | Gomes et al. | 423/53 |
| 1,255,144 | 2/1918 | Ekeley et al. | 423/53 |
| 3,373,097 | 9/1968 | Gomes et al. | 204/64 R |
| 3,692,479 | 9/1972 | Meadows | 423/440 |
| 3,743,499 | 7/1973 | Ramqvist | 423/440 |
| 3,914,113 | 10/1975 | Chiu | 423/440 |
| 4,190,439 | 2/1980 | Gortsema | 75/211 |
| 4,256,496 | 3/1981 | Brandstetter | 106/43 |
| 4,402,737 | 9/1983 | Kronenwetter et al. | 423/440 |
| 4,489,044 | 12/1984 | Gomes et al. | 423/53 |
| 4,834,963 | 5/1989 | Terry et al. | 423/440 |

OTHER PUBLICATIONS

"Preparation of Tungsten Carbide by Gas Sparging Tungstate Melts", Gomes et al., Paper No. A84-84, published 1984, Met. Soc. of AIME.

*Primary Examiner*—Gary P. Straub
*Attorney, Agent, or Firm*—Larry R. Meenan

[57] ABSTRACT

A molten blend of an alkali metal halide containing tungsten is treated with solid particulate carbonaceous reactants, such as natural flake graphite. Tungsten monocarbide is produced having a large percentage of relatively coarse crystals. The crystal morphology is blocky or thick bladed with some equant forms and the carbon is present in the correct stoichiometric amount of 6.13% by weight, thus eliminating any need for carbon additions prior to sintering.

17 Claims, No Drawings

PROCESS FOR PRODUCING TUNGSTEN MONOCARBIDE

This is a continuation of copending application Ser. No. 07/299,298 filed on Jan. 23, 1989, abandoned.

BACKGROUND OF THE INVENTION

1. Field of the Invention

This invention relates to a process for producing tungsten monocarbide (WC) and more particularly to a process involving reacting a molten composition comprising an alkali metal halide and an oxygen compound of tungsten with solid carbonaceous reactants.

2. Description of the Related Art

U.S. Pat. No. 4,489,044 (Gomes et al.) discloses a method of producing tungsten monocarbide. A melt containing an alkali metal halide and an oxygen compound of tungsten is sparged with a gaseous hydrocarbon, particularly methane. The preferred alkali metal halide is sodium chloride, but the alkali metal halide may also consist of fluorides or bromides of sodium, potassium or lithium. Additionally mixed metal compounds such as NaAlF or KAlF may also be used. The oxygen compound of tungsten is wolframite, (Fe, Mn) $WO_4$, or scheelite, $CaWO_4$. The gaseous hydrocarbon is preferably methane in the form of natural gas, but other gaseous hydrocarbons can also be used such as ethane, acetylene, propane or butane as well as mixtures of the hydrocarbon gas or gases with $H_2$ or CO. The Gomes et al. patent discloses that reactants such as powdered charcoal, coke breeze or calcium carbide may be added to the sodium chloride melt to facilitate reduction during sparging. Finally, the patent teaches that reduction and crystal growth may be assisted by the addition of small amounts of alkali metal borates, carbonates, fluorides or hydroxides.

The sparging is carried out in a conventional refractory crucible made from materials such as graphite or ceramics such as alumina, magnesia, zircon or silicon carbide. Refractory metal alloys such as Inconel are particularly effective. The sparging takes place at a temperature between about 900° to 1100° C. The flow rate of the gaseous hydrocarbon is between about 4 to 12 liters per minute per liter of melt for a period of about 3 to 8 hours.

The tungsten monocarbide produced by the method disclosed in the Gomes et al. patent has a microstructure in the form of platelets and twinned crystals. The crystals exhibit no major growth along the Z-axis. This morphology results in tungsten monocarbide that is not the norm of the cemented carbide industry and the crystals lack the strength necessary to make acceptable cemented carbide products.

The tungsten monocarbide produced by the Gomes et al. method also results in the carbon content being in the range of generally 6.08–6.10% by weight of the total WC. The correct stoichiometric amount of carbon in WC is 6.13% by weight. Thus the Gomes et al. method results in WC that is under-carburized and subsequent processing is required to increase the carbon content before the WC can be commercially utilized. The grain size of the WC produced by the Gomes et al. method is quite small, with more than 50% of the grains being smaller than 15 micrometers in average diameter.

It is an object of the present invention to produce tungsten monocarbide having a preferred crystal morphology. The crystals produced by the process of the present invention show greater growth along the Z axis, thus producing more blocky or thick bladed, and some equant, forms.

It is a further object of the present invention to produce crystals of tungsten monocarbide that contain carbon in the stoichiometrically correct ratio of 6.13% carbon by weight directly from a melt of an alkali metal halide and an oxygen compound of tungsten.

It is a feature of the present invention that tungsten monocarbide is produced from a melt of an alkali metal halide and an oxygen compound of tungsten by the addition of solid carbonaceous material and without the use of sparging.

It is an advantage of the present invention that tungsten monocarbide is produced having a large percentage of relatively coarse crystals that is acceptable for making sintered or cemented carbide products. The product also has application beyond cutting tools and wear parts, such as in hard facing welding rods and diamond bonding matrix powders.

SUMMARY OF THE INVENTION

Solid carbonaceous reactants are mixed with an alkali metal halide and an oxygen compound of tungsten. This mixture is heated until the composition becomes molten to produce tungsten monocarbide. Solid carbonaceous reactants such as natural flake graphite or carbon black or solid hydrocarbons such as table sugar yield tungsten monocarbide in a relatively short period of time without the need for sparging the melt with a hydrocarbon gas.

DETAILED DESCRIPTION OF THE PREFERRED EMBODIMENTS

The starting source for tungsten is any of the conventional tungsten oxide concentrates such as wolframite or scheelite. The tungsten oxide concentrate is blended with an alkali metal halide and an alkali silicate. The alkali metal halide can be any of the chlorides, fluorides or bromides of sodium, potassium or lithium. Also mixed metal compounds of these materials may be used, such as NaAlF or KAlF. The preferred alkali silicate is sodium meta-silicate which permits the proper melting temperature to be achieved.

The blended compound is melted in preferably a graphite crucible. Other refractory crucibles may be used, but metallic crucibles containing chromium should be avoided because chromium may contaminate the molten bath and form chromium oxide. Chromium oxide is difficult to separate from tungsten monocarbide crystals.

In the melt, the silicate combines with the Fe, Mn, Ca and other impurities to form a slag which sinks down to the bottom of the crucible. The halide salt phase containing the tungsten values has a lower specific gravity than the slag and therefore floats on top of the slag. This process for converting the tungsten oxide to a tungsten halide is conventional and is described in U.S. Pat. No. 3,373,097, which is incorporated herein by reference.

The halide salt phase containing the tungsten values is poured off the slag and then cooled to a solid material. The solid material is subsequently ground with powder and then blended with the solid carbonaceous reactants.

Natural flake graphite is the preferred solid carbonaceous reactant. The particle size of the natural flake graphite is important with the preferable size being generally larger than 75 micrometers and most preferably generally larger than 300 micrometers. Carbon black, HPN-200 graphite, or table sugar can also be used. HPN-200 graphite is a high purity, natural flake graphite that is sold by Dixon Graphite Co. in Lakehurst, N.J.

The mixture of the halide salt containing the tungsten values and the carbonaceous reactant is heated to a temperature in a range of approximately 900° to 1100° C. at ambient pressure. Temperatures in excess of generally 1100° C. should not be used to avoid fuming of the halide salts. The melt is maintained at this elevated temperature for at least one hour or longer to allow the reaction to be completed. The tungsten reacts with the carbonaceous reactant to form tungsten monocarbide which deposits on the bottom of the crucible. Once the reaction is complete, the halide salt is poured out of the crucible and the tungsten monocarbide can be recovered from the crucible. After being permitted to cool, the tungsten monocarbide crystals are then removed from the remaining reaction products and any unreacted materials. The tungsten monocarbide is cleaned by leaching with a hydrochloric acid solution. The resulting product is also treated with a conventional gravity separation process such as by panning to remove any free carbon remaining from the carbonaceous reactant that may be present.

The invention will be more specifically illustrated by the following example:

EXAMPLE

A mixture was prepared of 3.90 kilograms of Wolframite, 5.55 kilograms of sodium chloride and 5.55 kilograms of sodium meta-silicate. This mixture was heated for one hour at 1090° C. and a tungsten bearing halide phase was formed as described in U.S. Pat. No. 3,373,097. The tungsten bearing halide phase was decanted from a slag layer containing the remaining impurities and approximately 8.10 kilograms of the tungsten bearing halide was obtained. This material was allowed to cool and then pulverized.

Approximately 7,300 grams of the pulverized (−40 mesh) tungsten bearing halide was mixed with 453.3 grams of natural flake graphite and placed into a crucible made of nickel base alloy 214. The particle size distribution of the natural flake graphite used was as follows: 850 micrometers—4.6%; 710 micrometers—8.5%; 600 micrometers—17.5%; 500 micrometers—31.3%; 425 micrometers—13.0%; 300 micrometers—12.9% and −300 micrometers—12.2%. The mixture was heated to 1070° C. for three hours and 50 minutes during which time the ingredients became molten and tungsten monocarbide was formed. The resulting halide slag was decanted leaving the tungsten monocarbide crystals behind in the crucible. The WC crystals were removed from the crucible, allowed to cool and then cleaned. The cleaning step consisted of a leaching of the WC crystals with a hydrochloric acid solution to remove any residual salt and any metal impurities that the WC crystals may have picked up from the crucible. The WC crystals were then gravity separated such as by panning to remove any free carbon and other insoluble materials. Following these cleaning steps, 209.7 grams of WC were obtained.

The tungsten monocarbide made by the method of the example was analyzed to determine the crystal morphology. The analysis determined that the crystals were generally blocky or thick bladed and many were in equant form. A chemical analysis determined that the carbon was present in the amount of 6.13% by weight, which is the correct stoichiometric amount of carbon in tungsten monocarbide. The tungsten monocarbide made by this process can be used directly in sintered or cemented carbide applications without the necessity of an additional carburizing step to bring the carbon content up to the correct stoichiometric amount.

Similar halide salt melts containing tungsten values were treated with other solid carbonaceous reactants such as carbon black, HPN-200 graphite, and sugar. Each of these carbonaceous reactants produced tungsten monocarbide directly from the melt with no need to sparge the melt with a hydrocarbon gas.

In each instance, an analysis was made of the crystal size of the resulting tungsten monocarbide. The results of these analyses is shown in the following tables.

TABLE 1

| Carbonaceous Reactant-Natural Flake Graphite | | |
|---|---|---|
| Sieve Designation (Micrometers) | (Standard U.S. Sieve Size) | % of Crystals Retained on Sieve |
| 106 | 140 | 15.0 |
| 90 | 170 | 12.0 |
| 53 | 270 | 27.0 |
| 45 | 325 | 8.0 |
| 38 | 400 | 11.0 |
| −38 | −400 | 19.0 |

TABLE 2

| Carbonaceous Reactant-Carbon Black | | |
|---|---|---|
| Sieve Designation (Micrometers) | (Standard U.S. Sieve Size) | % of Crystals Retained on Sieve |
| 45 | 325 | 9.5 |
| 38 | 400 | 6.0 |
| 30 | | 30.2 |
| 20 | | 35.6 |
| 15 | | 13.4 |
| 10 | | 4.8 |
| 5 | | 0.5 |
| −5 | | 0 |

TABLE 3

| Carbonaceous Reactants-HPN-200 Graphite | | |
|---|---|---|
| Sieve Designation (Micrometers) | (Standard U.S. Sieve Size) | % of Crystals Retained on Sieve |
| 38 | 400 | 4.0 |
| 30 | | 47.9 |
| 20 | | 37.2 |
| 15 | | 7.9 |
| 10 | | 2.6 |
| 5 | | 0.4 |
| −5 | | 0 |

TABLE 4

| Carbonaceous Reactant-Sugar | | |
|---|---|---|
| Sieve Designation (Micrometers) | (Standard U.S. Sieve Size) | % of Crystals Retained on Sieve |
| 45 | 325 | 7.0 |
| 38 | 400 | 1.0 |
| 30 | | 23.0 |
| 20 | | 25.5 |
| 15 | | 20.6 |
| 10 | | 12.0 |
| 5 | | 8.2 |
| −5 | | 2.7 |

An analysis was also made of the crystal size of the tungsten monocarbide made by the gas sparging method set out in the Gomes et al. patent.

TABLE 5

| Hydrocarbon Gas Sparging Method | | |
|---|---|---|
| Sieve Designation (Micrometers) | (Standard U.S. Sieve Size) | % of Crystals Retained on Sieve |
| 45 | 325 | 3.0 |
| 38 | 400 | 1.0 |
| 30 |  | 4.8 |
| 20 |  | 13.1 |
| 15 |  | 11.5 |
| 10 |  | 28.9 |
| 5 |  | 25.0 |
| −5 |  | 12.7 |

A comparison of these tables reveals that the solid carbonaceous reactant process of the present invention yields crystal sizes much coarser than those obtained by the Gomes et al. gas sparging technique. In each instance, the addition of solid carbonaceous reactants without the use of gas sparging yields coarse crystal sizes, of which most are in excess of 15 micrometers. The use of natural flake graphite results in coarse crystal sizes in which 81% are larger than 38 micrometers.

The Gomes et al. method, on the other hand, produces crystal sizes in which approximately two-thirds of the crystals are smaller than 15 micrometers. Such fine tungsten monocarbide crystals have limited application in the cemented carbide industry.

While the invention has been illustrated with respect to several specific embodiments thereof, these embodiments should be considered as illustrative rather than limiting. Various modifications and additions may be made and will be apparent to those skilled in the art. For example, instead of mixing the carbonaceous reactants with the salt phase in its solid condition, the solid carbonaceous reactants can be added to the salt phase in its molten condition. This step can be done right after the molten salt phase is separated from the slag phase.

Accordingly, the invention should not be limited by the foregoing description, but rather should be defined only by the following claims.

What is claim is:

1. A process for producing coarse tungsten monocarbide crystals comprising the steps of:
   (a) providing an alkali metal halide salt containing tungsten oxide;
   (b) reacting a solid carbonaceous reactant selected from the group consisting of natural flake graphite, carbon black, HPN-200 graphite and sugar with said alkali metal halide salt containing tungsten oxide without sparging with a hydrocarbon gas to produce coarse tungsten monocarbide crystals at least 50% of which are larger than 15 micrometers; and
   (c) removing said coarse tungsten monocarbide crystals from the remaining reaction products and any unreacted material.

2. The process as set forth in claim 1 further comprising the steps of:
   (a) mixing an alkali metal halide, an alkali silicate and a tungsten oxide concentrate to form a blend;
   (b) melting said blend to form a halide salt phase containing tungsten oxide and a slag phase containing silicates and impurities; and
   (c) separating from the slag phase an alkali metal halide salt containing tungsten oxide.

3. The process as set forth in claim 2 wherein the alkali metal halide is selected from the group consisting of sodium chloride, potassium chloride, lithium chloride, sodium bromide, potassium bromide, lithium bromide, sodium fluoride, potassium fluoride, lithium fluoride, sodium aluminum fluoride and potassium aluminum fluoride.

4. The process as set forth in claim 2 wherein the alkali silicate is sodium meta-silicate.

5. The process as set forth in claim 2 wherein the tungsten oxide concentrate is selected from the group consisting of wolframite and scheelite.

6. The process as set forth in claim 2 wherein the alkali metal halide is sodium chloride, the alkali silicate is sodium silicate and the carbonaceous reactant is natural flake graphite.

7. The process as set forth in claim 2 wherein the reacting of said carbonaceous reactant with the tungsten values occurs at a temperature of between 900° C. and 1100° C.

8. The process as set forth in claim 7 wherein the temperature is approximately 1070° C.

9. The process as set forth in claim 2 further including the step of cleaning the coarse tungsten monocarbide crystals to yield pure coarse tungsten monocarbide.

10. The process as set forth in claim 9 wherein the cleaning includes leaching with a hydrochloric acid solution.

11. The process as set forth in claim 9 wherein the cleaning includes gravity separation to remove any free carbon.

12. The process as set forth in claim 2 wherein the carbonaceous reactant is added to the salt phase while the salt phase is in a molten condition.

13. The process as set forth in claim 2 wherein the carbonaceous reactant is added to the salt phase while the salt phase is in a solid condition.

14. The process as set forth in claim 2 wherein the coarse tungsten monocarbide comprises blocky or thick bladed and equant crystals.

15. The process as set forth in claim 14 wherein at least 50% of said coarse tungsten monocarbide crystals formed are larger than 53 micrometers.

16. The process as set forth in claim 2 wherein the carbonaceous reactant is a natural flake graphite having at least 50% of the natural flake graphite particles larger than 500 micrometers.

17. The process as set forth in claim 2 wherein at least 50% of the carbonaceous reactant is larger than 200 micrometers.

* * * * *